US012172867B2

(12) United States Patent
Roberts

(10) Patent No.: US 12,172,867 B2
(45) Date of Patent: Dec. 24, 2024

(54) BUILDING DRIFT DETERMINATION BASED ON ELEVATOR ROPING POSITION

(71) Applicant: OTIS ELEVATOR COMPANY, Farmington, CT (US)

(72) Inventor: Randy Roberts, Hebron, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1120 days.

(21) Appl. No.: 16/456,644

(22) Filed: Jun. 28, 2019

(65) Prior Publication Data

US 2020/0407191 A1 Dec. 31, 2020

(51) Int. Cl.
*B66B 7/06* (2006.01)
*B66B 5/00* (2006.01)
*B66B 9/00* (2006.01)

(52) U.S. Cl.
CPC .............. *B66B 5/0006* (2013.01); *B66B 9/00* (2013.01)

(58) Field of Classification Search
CPC ........... B66B 5/0006; B66B 9/00; B66B 7/06; B66B 5/022; B66B 5/12; B66B 5/0018; B66B 5/02; B66F 7/06
See application file for complete search history.

(56) References Cited

U.S. PATENT DOCUMENTS 5,731,528 A * 3/1998 Yamazaki .............. G01L 5/042 73/862.41
9,359,172 B2 * 6/2016 Mangini ................ B66B 5/021
11,292,693 B2 * 4/2022 Roberts .................. B66B 5/022
2013/0213742 A1 * 8/2013 Hakala .................... B66B 5/022 187/247
2013/0275081 A1 * 10/2013 Benosman ................ B66B 7/06 703/1
2014/0000985 A1 * 1/2014 Fukui ...................... B66B 5/022 187/247
2014/0069747 A1 * 3/2014 Benosman ................ B66B 7/06 187/414

(Continued)

FOREIGN PATENT DOCUMENTS

CN 108946360 A 12/2018
JP 2006124102 A 5/2006

(Continued)

OTHER PUBLICATIONS

Extended European Search Report for Application No. 19 216 916.7 dated Jul. 20, 2020.

(Continued)

*Primary Examiner* — Edwin J Toledo-Duran
(74) *Attorney, Agent, or Firm* — Carlson, Gaskey & Olds, P.C.

(57) ABSTRACT

An illustrative example embodiment of a system for detecting drift of a building includes a detector that detects at least one horizontal position of elevator roping within a hoistway in or on the building at a selected vertical location. A processor determines at least one characteristic of drift of the building based on information from the detector regarding the detected at least one horizontal position, information regarding tension on the elevator roping, information regarding a density of the elevator roping, and a relationship between the selected vertical location and a length of the elevator roping.

21 Claims, 4 Drawing Sheets

(56) References Cited

U.S. PATENT DOCUMENTS

| | | | | |
|---|---|---|---|---|
| 2014/0299420 | A1* | 10/2014 | Hakala | B66B 5/027 187/361 |
| 2015/0008075 | A1* | 1/2015 | Benosman | B66B 7/06 187/247 |
| 2017/0210597 | A1* | 7/2017 | Seki | B66B 5/04 |
| 2018/0016117 | A1 | 1/2018 | Palazzola et al. | |
| 2018/0265327 | A1* | 9/2018 | Benosman | B66B 7/06 |
| 2020/0407191 | A1* | 12/2020 | Roberts | B66B 5/022 |
| 2022/0348436 | A1* | 11/2022 | Taniguchi | B66B 7/1215 |

FOREIGN PATENT DOCUMENTS

| | | | |
|---|---|---|---|
| JP | 2020132427 | A | 8/2020 |
| WO | 2016/120373 | A1 | 8/2016 |

OTHER PUBLICATIONS

Extended European Search Report for Application No. EP 22 20 8425.3 dated Jun. 6, 2023.

* cited by examiner

BUILDING DRIFT DETERMINATION BASED ON ELEVATOR ROPING POSITION

BACKGROUND

Elevator systems are useful for carrying passengers and items between different levels of a building. Elevator systems in high rise buildings typically are traction-based and include roping that suspends the elevator car and a counterweight. A machine causes movement of a traction sheave that, in turn, causes movement of the roping for moving the elevator car as desired.

Elevator roping arrangements may experience sway or drift when the building in which the elevator system is installed sways or drifts. A variety of approaches have been proposed to address elevator roping sway including using dampers in the hoistway and controlling elevator car movement to mitigate sway. It is useful to avoid roping sway to maintain a desired level or quality of ride and to avoid damaging elevator system components.

SUMMARY

An illustrative example embodiment of a system for detecting drift of a building includes a detector that detects at least one horizontal position of elevator roping within a hoistway in or on the building at a selected vertical location. A processor determines at least one characteristic of drift of the building based on information from the detector regarding the detected at least one horizontal position, information regarding tension on the elevator roping, information regarding a density of the elevator roping, and a relationship between the selected vertical location and a length of the elevator roping.

In an example embodiment having one or more features of the system of the previous paragraph, the detector detects a plurality of horizontal positions of the elevator roping within a selected time period and the information from the detector regarding the at least one horizontal position is an average of the plurality of horizontal positions.

In an example embodiment having one or more features of the system of any of the previous paragraphs, the elevator roping comprises a plurality of vertically extending members, the plurality of horizontal positions include detected positions of more than one of the vertically extending members, and the average of the plurality of horizontal positions is based on the detected positions of the more than one of the vertically extending members.

In an example embodiment having one or more features of the system of any of the previous paragraphs, the at least one horizontal position of the elevator roping indicates an offset between an actual horizontal position of the elevator roping at the selected vertical location and an expected horizontal position of the elevator roping at the selected vertical location without the drift; and the at least one characteristic of drift comprises a horizontal offset of a top of the building relative to a bottom of the building resulting from the drift.

In an example embodiment having one or more features of the system of any of the previous paragraphs, the offset comprises a two-dimensional difference between the actual horizontal position and the expected horizontal position.

In an example embodiment having one or more features of the system of any of the previous paragraphs, the processor uses a predetermined catenary equation when determining the at least one characteristic of the drift of the building.

In an example embodiment having one or more features of the system of any of the previous paragraphs, the elevator roping comprises a suspension member, a compensation member, or a governor member.

In an example embodiment having one or more features of the system of any of the previous paragraphs, the detector comprises at least one of a light detection and ranging (LIDAR) sensor and a red-green-blue-depth (RGB-D) camera.

An illustrative example embodiment of a method of detecting drift of a building that includes elevator roping within a hoistway in or on the building includes detecting at least one horizontal position of the elevator roping at a selected vertical location and using at least one processor for determining at least one characteristic of drift of the building based on information regarding the detected at least one horizontal position, information regarding tension on the elevator roping, information regarding a density of the elevator roping, and a relationship between the selected vertical location and a length of the elevator roping.

An example embodiment having one or more features of the method of the previous paragraph includes detecting a plurality of horizontal positions of the elevator roping within a selected time period and wherein the information regarding the at least one horizontal position is an average of the plurality of horizontal positions.

In an example embodiment having one or more features of the method of any of the previous paragraphs, the elevator roping comprises a plurality of vertically extending members, the plurality of horizontal positions include detected positions of more than one of the vertically extending members, and the average of the plurality of horizontal positions is based on the detected positions of the more than one of the vertically extending members.

In an example embodiment having one or more features of the method of any of the previous paragraphs, determining an offset between an actual horizontal position of the elevator roping at the selected vertical location and an expected horizontal position of the elevator roping at the selected vertical location without the drift; and the at least one characteristic of drift comprises a horizontal offset of a top of the building relative to a bottom of the building resulting from the drift.

In an example embodiment having one or more features of the method of any of the previous paragraphs, the offset comprises a two-dimensional difference between the actual horizontal position and the expected horizontal position.

In an example embodiment having one or more features of the method of any of the previous paragraphs, determining the at least one characteristic of the drift of the building comprises using a predetermined catenary equation.

In an example embodiment having one or more features of the method of any of the previous paragraphs, the elevator roping comprises a suspension member, a compensation member, or a governor member.

In an example embodiment having one or more features of the method of any of the previous paragraphs, detecting the at least one horizontal position comprises using at least one of a light detection and ranging (LIDAR) sensor and a red-green-blue-depth (RGB-D) camera.

An illustrative example embodiment of an elevator system associated with a building includes an elevator car that is moveable along a vertical pathway; elevator roping associated with the elevator car, the elevator roping extending vertically and following a generally vertical path of movement as the elevator car moves; a detector that detects at least one horizontal position of the elevator roping at a selected vertical location when the elevator car is near one end of the vertical pathway; and a processor that determines at least one characteristic of drift of the building based on information from the detector regarding the detected at least one horizontal position, information regarding tension on the elevator roping, information regarding a density of the elevator roping, and a relationship between the selected vertical location and a length of the elevator roping.

In an example embodiment having one or more features of the system of the previous paragraph, the elevator roping comprises a suspension member that supports a weight of the elevator car, a compensation member that is coupled to an underside of the elevator car, or a governor member that moves at a speed corresponding to a speed of movement of the elevator car.

In an example embodiment having one or more features of the system of any of the previous paragraphs, the detector comprises at least one of a light detection and ranging (LIDAR) sensor and a red-green-blue-depth (RGB-D) camera.

In an example embodiment having one or more features of the system of any of the previous paragraphs, the detector detects a plurality of horizontal positions of the elevator roping within a selected time period and the information from the detector regarding the at least one horizontal position is an average of the plurality of horizontal positions.

The various features and advantages of at least one disclosed example embodiment will become apparent to those skilled in the art from the following detailed description. The drawings that accompany the detailed description can be briefly described as follows.

DETAILED DESCRIPTION

Figure 1:
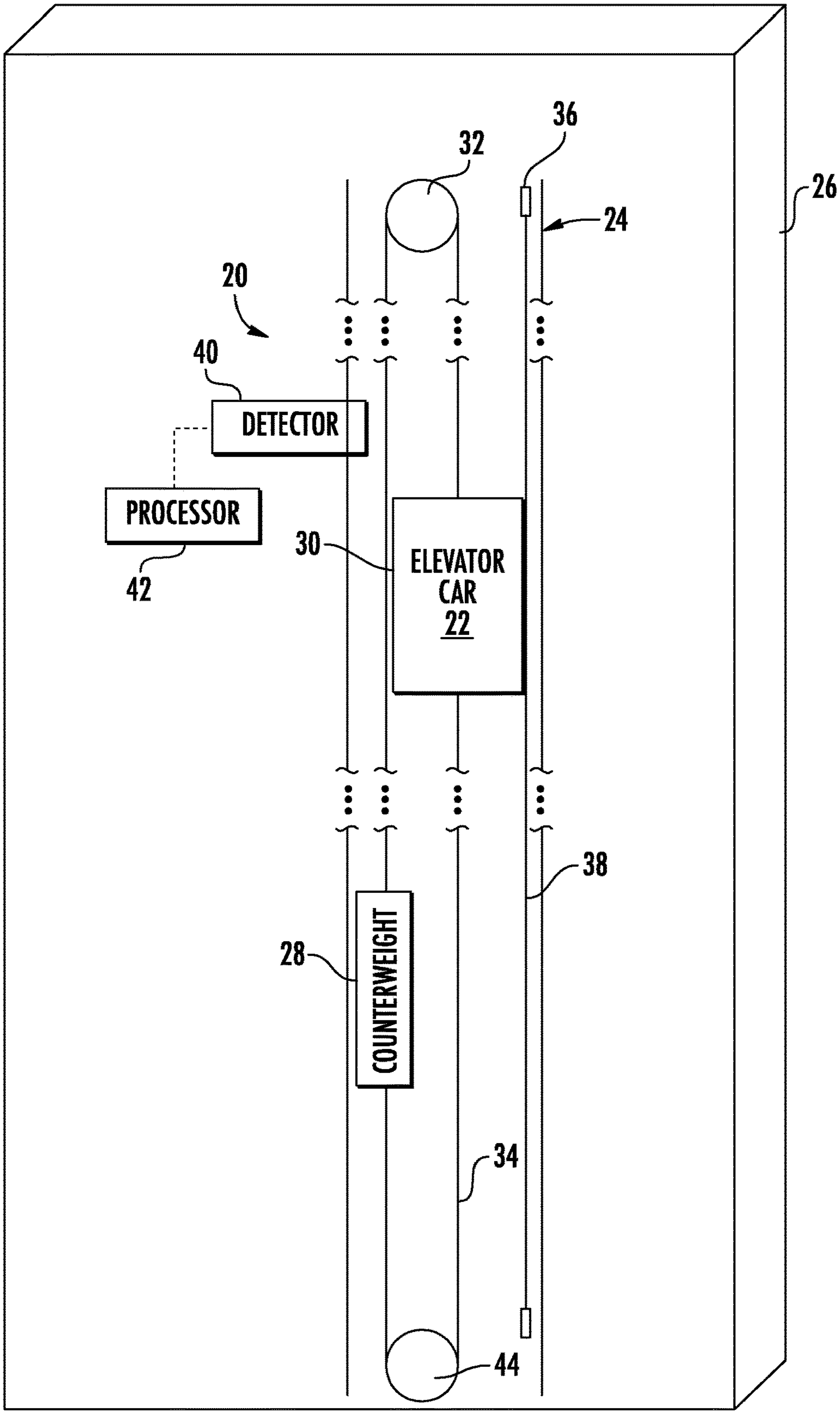
FIG. 1 schematically illustrates selected portions of an elevator system including a building drift detector designed according to an embodiment of this disclosure.

FIG. 1 schematically shows selected portions of an elevator system 20. An elevator car 22 is situated for movement along a vertical path in a hoistway 24 within a building 26. The elevator car 22 is coupled with a counterweight 28 by suspension roping 30. A traction sheave 32 is associated with a machine (not specifically illustrated) to cause selected movement of the suspension roping 30 to control the movement and position of the elevator car 22 within the hoistway 24. Compensation roping 34 is associated with the elevator car 22 and the counterweight 28. A governor 36 includes governor roping 38 that moves with the elevator car 22 for activating safeties (not illustrated) in a manner that is understood by those skilled in the art.

The elevator system 20 includes a detector 40 situated at least partially in the hoistway 24 at a selected vertical location, which may be fixed or variable. In some embodiments the detector 40 remains in a single vertical location. In other embodiments, the detector 40 is supported on a moving mechanism that allows for selectively changing the vertical location of the detector 40. The detector 40 detects a horizontal position of elevator roping, such as the suspension roping 30, compensation roping 34, or governor roping 38.

A processor 42 utilizes information from the detector 40 regarding the detected horizontal position of the elevator roping and other information for determining at least one characteristic of drift of the building 26. In the illustrated example, the processor 42 uses information regarding tension on the elevator roping, density of the elevator roping, and a relationship between the vertical location of the detector 40 and the length of the portion of the elevator roping that is being detected. The length of the elevator roping may be, for example, the length of the suspension roping 30 between the elevator car 22 and the traction sheave 32 when the elevator car 22 is near a bottom landing of the vertical pathway within the hoistway 24. In another example scenario, the length of the elevator roping is a length of the compensation roping 34 between the elevator car 22 and a compensation sheave 44 near a bottom of the hoistway 24 when the elevator car 22 is near the top of the vertical pathway of the elevator car 22. The processor 42 also uses a predetermined rope catenary equation and information regarding building drift mode shapes for determining the at least one characteristic of drift of the building 26. There are known rope catenary equations and the processor 42 is programmed or otherwise configured to use the information above to determine at least one characteristic of building drift.

The processor 42 comprises a computing device and associated memory. In some embodiments, the memory includes programming or computer-executable instructions that are executed by the processor 42 for determining or measuring building drift.

Figure 2:
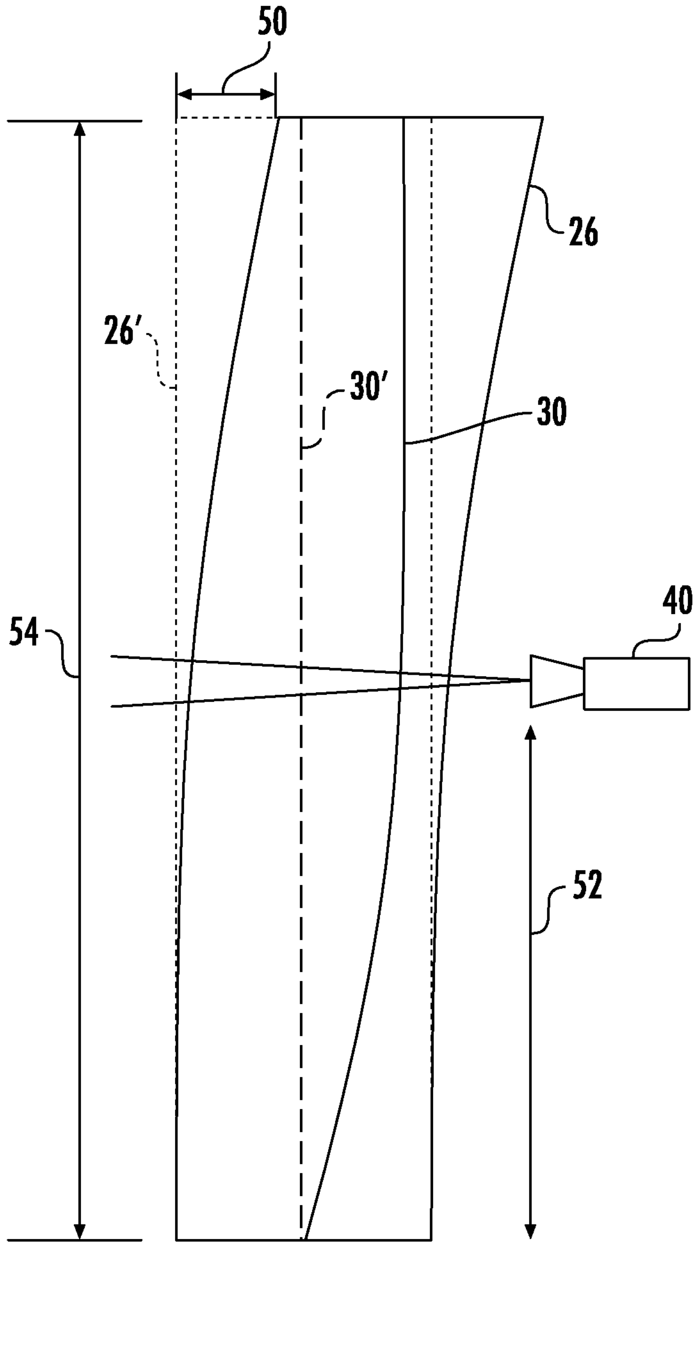
FIG. 2 schematically illustrates an example scenario in which the building drift detector is useful.

FIG. 2 schematically illustrates a scenario that includes building drift. An actual orientation or configuration of the building 26 includes the top of the building horizontally offset by a distance 50 compared to a vertical position schematically shown at 26' if there were no drift. Building drift as used in this description refers to the static or semi-permanent deflection of a building structure compared to a designed or true vertical arrangement. Building drift may exist because of wind drag or thermal differential expansion, for example. Building drift as used in this description is distinct from building sway which involves oscillations or ongoing movement of a building structure, which may occur during an earthquake, for example.

As can be appreciated from FIG. 2, the elevator suspension roping 30 deviates from a designed or truly vertical pathway 30' that the suspension roping 30 would follow if there were no building drift. The detector 40 is situated at the preselected vertical height represented at 52 to detect an actual horizontal position of the suspension roping 30 at that vertical location. The length of the suspension roping 30 under consideration in the illustrated scenario is represented at 54. The processor 42 utilizes a ratio between the distances 52 and 54 as part of the determination of at least one characteristic of the building drift.

Figure 3:
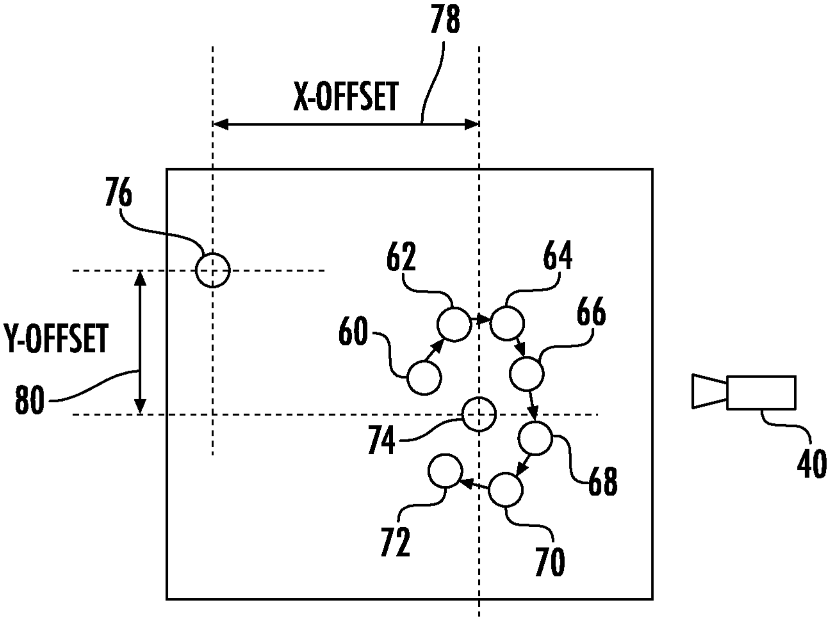
FIG. 3 schematically illustrates different elevator roping positions detected by the building drift detector.

FIG. 3 schematically illustrates a plurality of detected horizontal positions 60, 62, 64, 66, 68, 70 and 72 of the elevator roping, such as the suspension roping 30, during a preselected amount of time. In the illustrated example, the elevator car 22 would be situated near a bottom of the hoistway 24 and parked at a landing. Under those conditions, the detector 40 detects multiple positions 60-72 of the elevator roping because there is some movement of the roping over time.

Either the detector 40 or the processor 42 determines an average position 74 of the elevator roping, which corresponds to an average of the positions 60-72. The average position 74 indicates a center of gravity for all detected elevator roping at the vertical location. Determining the average position 74 in some embodiments is based upon detecting positions of a single roping member over time. In other embodiments, which include multiple suspension roping members 30, the average position 74 is based on a plurality of detected horizontal positions of more than one of the suspension roping members.

As can be appreciated from FIG. 3, the average horizontal position 74 is horizontally offset from an expected or design position 76 that corresponds to the horizontal position the elevator roping would be in at the vertical location of the detector 40 if there were no building drift. The illustrated example embodiment provides two dimensional horizontal offset information regarding a difference between the average actual horizontal position 74 of the elevator roping relative to the expected or designed position 76. The horizontal offset information in one dimension is represented at 78 in FIG. 3 while the offset information in the second dimension is represented at 80.

The expected or design position 76 is determined in some embodiments by detecting the horizontal position of the elevator roping at the selected vertical location under known conditions with minimal building drift or sway. The detector 40 may be calibrated under such conditions and the expected horizontal position 76 may be stored in memory accessible to the processor 42.

In some embodiments, the detector 40 comprises a light detection and ranging (LIDAR) sensor. Such sensors are capable of providing two dimensional position information. LIDAR sensors also provide high resolution for determining the average horizontal position 74 within desired tolerances. Some embodiments include a red-green-blue-depth (RGB-D) camera as the detector 40.

The information from the detector 40 regarding the horizontal offset of the average position 74 relative to the expected position 76 facilitates determining a characteristic of the building drift, such as a horizontal offset of the top of the building 26 shown at 50 in FIG. 2, compared to a position of the top of the building if there were no drift as shown in at 26'. The horizontal offset 50 of the top of the building 26 relative to the bottom of the building changes the location of the top of the suspension roping 30 relative to the bottom of the suspension roping 30. The density of the suspension roping 30, the tension on the suspension roping 30, the relationship between the vertical location of the detector 40 and the length 54 of the segment of elevator roping under considerations and the average horizontal position 74 are all used by the processor 42 and a predetermined catenary equation for determining the relative offset between the ends of the suspension roping 30. That information and predetermined information regarding modes of building drift allow the processor 42 to determine at least one characteristic of the building drift.

Figure 4:
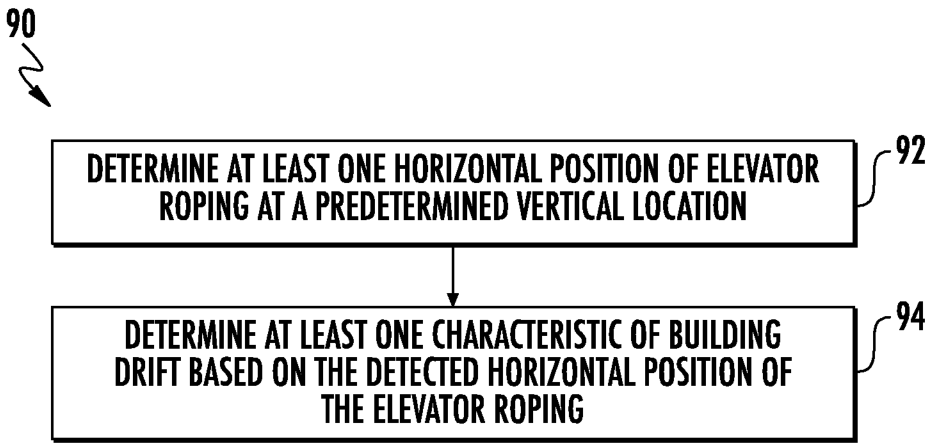
FIG. 4 is a flow chart diagram summarizing an example method of determining building drift according to an embodiment of this disclosure.

FIG. 4 includes a flowchart diagram 90 that summarizes an example approach. At 92, the detector 40 detects at least one horizontal position of elevator roping at the selected vertical location. At 94 the processor 42 determines at least one characteristic of building drift based on the detected horizontal position of the elevator roping and the other information mentioned above.

The disclosed example embodiment provides a solution for measuring or determining building drift, which is useful for ultra-high rise buildings.

The disclosed example arrangement is useful for measuring building drift and may be incorporated into an elevator roping sway mitigation system.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A system for detecting drift of a building that includes elevator roping within a hoistway in or on the building, the system comprising:
- a detector that detects at least one horizontal position of the elevator roping at a selected vertical location; and
- a processor that determines drift of the building based on information from the detector regarding the detected at least one horizontal position, information regarding tension on the elevator roping, information regarding a density of the elevator roping, and a relationship between the selected vertical location and a length of the elevator roping, and wherein drift comprises a static or semi-permanent deflection of the building as compared to a designed or true vertical arrangement of the building.

2. The system of claim 1, wherein
- the at least one horizontal position of the elevator roping indicates an offset between an actual horizontal position of the elevator roping at the selected vertical location and an expected horizontal position of the elevator roping at the selected vertical location without the drift; and
- the drift is a static condition that comprises at least a horizontal offset of a top of the building relative to a bottom of the building resulting from the drift.

3. The system of claim 2, wherein the offset comprises a two-dimensional difference between the actual horizontal position and the expected horizontal position.

4. The system of claim 1, wherein the processor uses a predetermined catenary equation when determining the drift of the building.

5. The system of claim 1, wherein the elevator roping comprises a suspension member, a compensation member, or a governor member.

6. The system of claim 1, wherein the detector comprises at least one of a light detection and ranging (LIDAR) sensor and a red-green-blue-depth (RGB-D) camera.

7. A system for detecting drift of a building that includes elevator roping within a hoistway in or on the building, the system comprising:
- a detector that detects at least one horizontal position of the elevator roping at a selected vertical location;
- a processor that determines drift of the building based on information from the detector regarding the detected at least one horizontal position, information regarding tension on the elevator roping, information regarding a density of the elevator roping, and a relationship between the selected vertical location and a length of the elevator roping;
- the detector detects a plurality of horizontal positions of the elevator roping within a selected time period; and
- the information from the detector regarding the at least one horizontal position is an average of the plurality of horizontal positions.

8. The system of claim 7, wherein
the elevator roping comprises a plurality of vertically extending members;
the plurality of horizontal positions include detected positions of more than one of the vertically extending members; and
the average of the plurality of horizontal positions is based on the detected positions of the more than one of the vertically extending members.

9. A method of detecting drift of a building that includes elevator roping within a hoistway in or on the building, the method comprising:
detecting at least one horizontal position of the elevator roping at a selected vertical location; and
using at least one processor for determining drift of the building based on information regarding the detected at least one horizontal position, information regarding tension on the elevator roping, information regarding a density of the elevator roping, and a relationship between the selected vertical location and a length of the elevator roping, and wherein drift comprises a static or semi-permanent deflection of the building as compared to a designed or true vertical arrangement of the building.

10. The method of claim 9, wherein
determining an offset between an actual horizontal position of the elevator roping at the selected vertical location and an expected horizontal position of the elevator roping at the selected vertical location without the drift; and
the drift is a static condition that comprises at least a horizontal offset of a top of the building relative to a bottom of the building resulting from the drift.

11. The method of claim 10, wherein the offset comprises a two-dimensional difference between the actual horizontal position and the expected horizontal position.

12. The method of claim 9, wherein determining the drift of the building comprises using a predetermined catenary equation.

13. The method of claim 9, wherein the elevator roping comprises a suspension member, a compensation member, or a governor member.

14. The method of claim 9, wherein detecting the at least one horizontal position comprises using at least one of a light detection and ranging (LIDAR) sensor and a red-green-blue-depth (RGB-D) camera.

15. A method of detecting drift of a building that includes elevator roping within a hoistway in or on the building, the method comprising:
detecting at least one horizontal position of the elevator roping at a selected vertical location;
detecting a plurality of horizontal positions of the elevator roping within a selected time period, and wherein information regarding the at least one horizontal position is an average of the plurality of horizontal positions; and
using at least one processor for determining drift of the building based on information regarding the detected at least one horizontal position, information regarding tension on the elevator roping, information regarding a density of the elevator roping, and a relationship between the selected vertical location and a length of the elevator roping.

16. The method of claim 15, wherein
the elevator roping comprises a plurality of vertically extending members;
the plurality of horizontal positions include detected positions of more than one of the vertically extending members; and
the average of the plurality of horizontal positions is based on the detected positions of the more than one of the vertically extending members.

17. An elevator system associated with a building, the elevator system comprising:
an elevator car that is moveable along a vertical pathway;
elevator roping associated with the elevator car, the elevator roping extending vertically and following a generally vertical path of movement as the elevator car moves;
a detector that detects at least one horizontal position of the elevator roping at a selected vertical location when the elevator car is near one end of the vertical pathway; and
a processor that determines drift of the building based on information from the detector regarding the detected at least one horizontal position, information regarding tension on the elevator roping, information regarding a density of the elevator roping, and a relationship between the selected vertical location and a length of the elevator roping, and wherein drift comprises a static or semi-permanent deflection of the building as compared to a designed or true vertical arrangement of the building.

18. The elevator system of claim 17, wherein the elevator roping comprises a suspension member that supports a weight of the elevator car, a compensation member that is coupled to an underside of the elevator car, or a governor member that moves at a speed corresponding to a speed of movement of the elevator car.

19. The elevator system of claim 17, wherein the detector comprises at least one of a light detection and ranging (LIDAR) sensor and a red-green-blue-depth (RGB-D) camera.

20. An elevator system associated with a building, the elevator system comprising:
an elevator car that is moveable along a vertical pathway;
elevator roping associated with the elevator car, the elevator roping extending vertically and following a generally vertical path of movement as the elevator car moves;
a detector that detects at least one horizontal position of the elevator roping at a selected vertical location when the elevator car is near one end of the vertical pathway;
a processor that determines drift of the building based on information from the detector regarding the detected at least one horizontal position, information regarding tension on the elevator roping, information regarding a density of the elevator roping, and a relationship between the selected vertical location and a length of the elevator roping;
the detector detects a plurality of horizontal positions of the elevator roping within a selected time period; and
the information from the detector regarding the at least one horizontal position is an average of the plurality of horizontal positions.

21. The elevator system of claim 20, wherein
the elevator roping comprises a plurality of vertically extending members;
the plurality of horizontal positions include detected positions of more than one of the vertically extending members; and the average of the plurality of horizontal positions is based on the detected positions of the more than one of the vertically extending members.

* * * * *